United States Patent Office 2,749,367
Patented June 5, 1956

2,749,367
METHOD FOR REMOVAL OF A SIDE CHAIN

Lloyd B. Barkley, Brentwood, Mo., assignor to Monsanto Chemical Company, St. Louis, Mo., a corporation of Delaware No Drawing. Application November 15, 1954, Serial No. 468,990

6 Claims. (Cl. 260—586)

This invention relates to a process for removal of the $\beta$-carboxyethyl side chain of certain polyhydrophenanthrene compounds referred to hereinafter as keto-acids.

1,8a - dimethyl - $\Delta^{10a(1)}$ - polyhydrophenanthren - 2 - ones of the structure

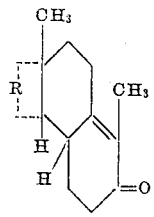

where R is a substituted or unsubstituted 4-carbon atom chain forming a 6-membered fused ring as described, are employed in the total synthesis of steroidal compounds of the cyclopentanopolyhydrophenanthrene series. In the intermediary steps which provide for ring A a $\beta$-carboxyethyl group is introduced to the 1-position of said 1,8a-dimethyl - $\Delta^{10a(1)}$ - polyhydrophenanthren - 2 - ones. By so doing a new asymmetric center is introduced which yields therefore a one hundred percent increase in the number of geometric isomers. These isomers are generically termed keto-acids, half of which are termed $\alpha$-keto-acids while the other half are termed $\beta$-keto-acids. As those skilled in the art are well aware only one of these keto-acid isomers is useful in synthesizing a particular steroid and, thusly, means have been constantly sought to convert the other to a useful product in the synthesis.

In accordance with this invention it has been found that the $\beta$-carboxyethyl side chain of a keto-acid of the structure

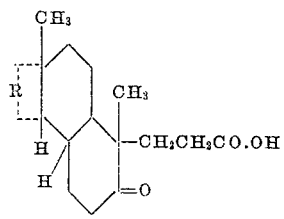

where R is a 4-carbon atom chain, which 4-carbon atom chain forms a 6-membered fused ring as described, is conveniently and efficiently removed by a process comprising continuously adding the keto-acid to a melt of an alkali metal salt of a hydrocarbon carboxylic acid at approximately the rate at which the keto-acid's side chain is pyrolyzed, the 1,8a - dimethyl - $\Delta^{10a(1)}$ - polyhydrophenanthren - 2 - one being recovered by distillation from the molten mass as it forms.

In the process of this invention the pyrolyzing temperature will be not lower than that at which the 1,8a-dimethyl-$\Delta^{10a(1)}$ - polyhydrophenanthren - 2 - one distills from the molten mass but less than its decomposition temperature. Although any pressure below atmospheric is operable, it is preferred that pressures below 100 mm. of mercury be employed.

The free keto-acids are prepared by methods fully described in the literature, e. g. J. A. C. S., 74, pp. 4223ff, and J. A. C. S., 75, p. 4110. As illustrative of starting materials contemplated by this invention are:

1,8a - dimethyl - 1 - ($\beta$ - carboxyethyl) - $\Delta^{5,7,10}$ - octahydrophenanthren - 2 - one;
1,8a - dimethyl - 1 - ($\beta$ - carboxyethyl) - $\Delta^{6,10}$ - decahydrophenanthren - 2 - one;
1,8a - dimethyl - 1 - ($\beta$ - carboxyethyl) - $\Delta^{10}$ - dodecahydrophenanthren - 2 - one;
1,8a - dimethyl - 1 - ($\beta$ - carboxyethyl) - $\Delta^{10}$ - dodecahydrophenanthren - 2,8 - dione;
1,8a - dimethyl - 1 - ($\beta$ - carboxyethyl) - 8 - bromo - $\Delta^{10}$ - dodecahydrophenanthren - 2 - one;
1,8a - dimethyl - 1 - ($\beta$ - carboxyethyl) - 8 - chloro - $\Delta^{10}$ - dodecahydrophenanthren - 2 - one;
1,8a - dimethyl - 1 - ($\beta$ - carboxyethyl) - 6,7 - dihydroxy - $\Delta^{10}$ - dodecahydrophenanthren - 2 - one acetonide;
and like 1,8a - dimethyl - 1 - ($\beta$ - carboxyethyl) - $\Delta^{10}$ - polyhydrophenanthren - 2 - ones.

As illustrative of the process of this invention is the following:

Example I

To a suitable reaction vessel equipped with a take-off tube connected through a vacuum adapter to a receiving vessel containing a molten mass consisting of 50 parts by weight of sodium acetate and 50 parts by weight of potassium acetate is added approximately 50 parts by weight of the $\alpha$ - isomer of $l$ - anti - trans - 1,8a - dimethyl - 1 - ($\beta$-carboxyethyl) - $\Delta^{6,10}$ - decahydrophenanthren - 2 - one. The addition is made over a period of about one hour while maintaining the temperature at 280–300° under 2 mm. of mercury vacuum, the $l$ - anti - trans - 1,8a - dimethyl - $\Delta^{6,10a(1)}$ - decahydrophenanthrene - 2 - one distilling off as it forms. The amount of $l$ - anti - trans - 1,8a - dimethyl - $\Delta^{6,10a(1)}$ - decahydrophenanthren - 2 - one (a colorless crystalline solid, M. P. 42–44° C.) recovered is 20 parts by weight.

Employing the foregoing procedure but employing sodium phenacetate instead of the mixture of alkali metal acetates similar results are obtained.

Colorless oily $dl$ - anti - trans - 1,8a - dimethyl-$\Delta^{6,10a(1)}$-decahydrophenanthren - 2 - one is obtained employing the procedure of Example I using either the $\alpha$-isomer or the $\beta$ - isomer of $dl$ - anti - trans - 1,8a - dimethyl - 1 - ($\beta$ - carboxyethyl) - $\Delta^{6,10}$ - decahydrophenanthren - 2 - one instead of the $\alpha$ - isomer of $l$ - anti - trans - 1,8a - dimethyl - 1 - ($\beta$ - carboxyethyl) - $\Delta^{6,10}$ - decahydrophenanthren - 2 - one.

Employing the procedure of Example I but replacing the $\alpha$ - isomer of $l$ - anti - trans - 1,8a - dimethyl - $\Delta^{6,10a(1)}$ - decahydrophenanthren - 2 - one with a chemically equivalent amount of the $\beta$ - isomer of $dl$ - anti - trans - 1,8a - dimethyl - 1 - ($\beta$ - carboxyethyl) - 6,7 - dihydroxy - $\Delta^{10}$ - dodecahydrophenanthren - 2 - one acetonide and the mixture of alkali metal acetates with an equal weight of sodium benzoate white crystalline $dl$ - anti - trans - 1,8a - dimethyl - 6,7 - dihydroxy - $\Delta^{10a(1)}$ - dodecahydrophenanthren - 2 - one acetonide is obtained.

The amount of alkali metal salt of a hydrocarbon monocarboxylic acid to which the keto-acid is continuously added may vary widely, however, it is preferred that the addition be so controlled that from 0.5 to 20 parts by weight for each part by weight of the keto-acid be present. In general, however, 1 to 5 parts by weight for each part by weight of the keto-acid gives optimum results.

The alkali metal salts of hydrocarbon carboxylic acids contemplated by this invention are those of the general formula R'—CO.OM, where R is an alkali metal such as Na, K or Li and where R' is a hydrocarbon radical such as methyl, ethyl, propyl, butyl, amyl, hexyl, octyl, decyl, benzyl, phenethyl, phenpropyl, phenyl, tolyl, ethylphenyl, naphthyl, etc. It is preferred that R contain not more than 10 carbon atoms. As specifically illustrative of the carboxylic acid salts contemplated are sodium acetate, potassium acetate, sodium propionate, sodium butyrate, sodium caproate, sodium caprylate, sodium phenylacetate, sodium benzoate, sodium naphthoate, and the like and various mixtures thereof. The sodium salts of the low molecular weight aliphatic monocarboxylic acids are preferred.

While the present invention has been described with respect to several embodiments it is to be understood it is not so limited and that various modifications thereof may be made within the skill of those versed in the art without departing from the spirit or scope of the invention.

What is claimed is:

1. The process of removing a $\beta$-carboxyethyl side chain from a keto-acid of the structure

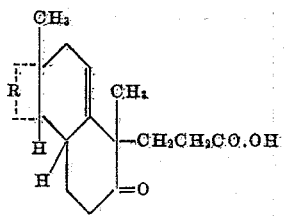

where R is a 4-carbon atom chain which forms a 6-membered fused ring as described, which comprises continuously adding the keto-acid to a melt of an alkali metal salt of a hydrocarbon monocarboxylic acid at approximately the rate at which the keto-acid's side chain is pyrolyzed and recovering a 1,8a - dimethyl - $\Delta^{10a(1)}$ - polyhydrophenanthren - 2 - one of the structure

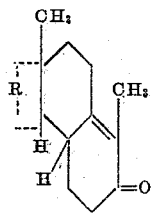

where R has the significance aforedescribed, by distillation from the molten mass as it forms, the pressure during the pyrolysis being below atmospheric.

2. The process of claim 1 wherein the pressure is below 100 mm. of mercury.

3. The process of claim 1 wherein the alkali metal salt of a hydrocarbon monocarboxylic acid is the sodium salt of a low molecular weight aliphatic carboxylic acid.

4. The process of removing the $\beta$-carboxyethyl side chain from an anti - trans - 1,8a - dimethyl - 1 - ($\beta$ - carboxyethyl) - $\Delta^{6,10}$ - decahydrophenanthren - 2 - one of the structure.

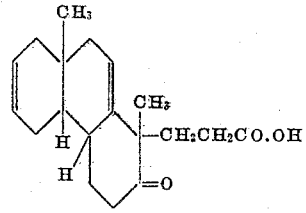

which comprises continuously adding the keto acid to a melt of an alkali metal salt of a hydrocarbon monocarboxylic acid at approximately the rate at which the keto-acid's side chain is pyrolyzed and recovering an anti-trans-1,8a - dimethyl - $\Delta^{6,10a(1)}$ - decahydrophenanthren - 2 - one of the structure

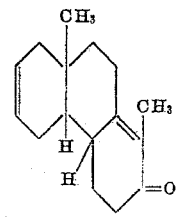

by distillation from the molten mass as it forms, the pressure during the pyrolysis being below atmospheric, the weight ratio of alkali metal salt to keto-acid during the addition of the latter to the former being maintained in a weight ratio of 1 to 5 parts alkali metal salt to one part keto-acid.

5. The process of claim 4 wherein the alkali metal salt is a mixture of sodium acetate and potassium acetate.

6. The process of claim 4 wherein the alkali metal salt is sodium phenacetate.

No references cited.